US011432976B2

(12) United States Patent
Baer

(10) Patent No.: US 11,432,976 B2
(45) Date of Patent: Sep. 6, 2022

(54) AMBULANCE VEHICLE AND METHOD FOR PROVIDING AN AMBULANCE VEHICLE

(71) Applicant: Siemens Healthcare GmbH, Erlangen (DE)

(72) Inventor: Sebastian Baer, Neunkirchen am Brand (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 74 days.

(21) Appl. No.: 16/951,193

(22) Filed: Nov. 18, 2020

(65) Prior Publication Data

US 2021/0161736 A1 Jun. 3, 2021

(30) Foreign Application Priority Data

Nov. 29, 2019 (EP) .................................... 19212522

(51) Int. Cl.

| | |
|---|---|
| ***B60J 7/00*** | (2006.01) |
| ***A61G 3/02*** | (2006.01) |
| ***A61G 3/00*** | (2006.01) |
| ***A61G 3/08*** | (2006.01) |

(52) U.S. Cl.

CPC ........... *A61G 3/0236* (2013.01); *A61G 3/001* (2013.01); *A61G 3/029* (2013.01); *A61G 3/0833* (2013.01)

(58) Field of Classification Search

CPC .. A61G 1/0212; A61G 1/0262; A61G 1/0237; A61G 1/06; A61G 1/0293; A61G 1/0567; A61G 1/04

See application file for complete search history.

(56) References Cited

U.S. PATENT DOCUMENTS

| | | | | |
|---|---|---|---|---|
| 3,644,944 A * | 2/1972 | Bourgraf | A61G 1/0567 | 5/610 |
| 4,097,941 A * | 7/1978 | Merkel | A61G 1/0567 | 108/147 |
| 4,273,374 A * | 6/1981 | Portman | A61G 3/001 | 248/222.52 |
| 5,135,350 A * | 8/1992 | Eel | A61G 1/0293 | 296/20 |

(Continued)

FOREIGN PATENT DOCUMENTS

| | | | |
|---|---|---|---|
| DE | 102008005900 | A1 | 7/2009 |
| FR | 2481110 | A1 | 10/1981 |

OTHER PUBLICATIONS

Hoverboard Powerbase, https://www.hover.at/wp-content/uploads/2020/09/Powerbase-Info-English.pdf, Status: Jan. 22, 2020.

(Continued)

*Primary Examiner* — Kiran B Patel
(74) *Attorney, Agent, or Firm* — Harness, Dickey & Pierce, P.L.C.

(57) ABSTRACT

An embodiment is directed to an ambulance vehicle, especially mobile stroke unit. The embodiment of the ambulance vehicle includes a support structure within an interior space of the ambulance vehicle for supporting a cot or stretcher used for transporting the patient. The embodiment of the ambulance vehicle further includes an actuator for tilting the support structure and/or the support structure being at least partially housed in a recess formed in a floor of the interior space.

17 Claims, 3 Drawing Sheets

(56) References Cited

U.S. PATENT DOCUMENTS

| | | | | |
|---|---|---|---|---|
| 5,365,622 | A * | 11/1994 | Schirmer | A61G 1/0565 5/611 |
| 5,490,703 | A | 2/1996 | Hewko | |
| 5,779,296 | A | 7/1998 | Hewko | |
| 6,332,638 | B1 * | 12/2001 | Menna | A61G 1/0565 296/20 |
| 6,890,137 | B2 * | 5/2005 | Hillberry | A61G 1/06 267/150 |
| 6,916,056 | B2 * | 7/2005 | Mitchell | A61G 1/0567 296/20 |
| 2004/0080172 | A1 * | 4/2004 | Mitchell | A61G 1/0293 296/20 |
| 2009/0015027 | A1 * | 1/2009 | Lambarth | A61G 3/0272 296/20 |
| 2011/0080016 | A1 * | 4/2011 | Lambarth | A61G 1/06 296/20 |
| 2012/0237326 | A1 * | 9/2012 | Van Ness | A61G 3/0272 414/507 |
| 2013/0336752 | A1 | 12/2013 | Crawford | |
| 2017/0119601 | A1 | 5/2017 | Bennett | |
| 2017/0202715 | A1 * | 7/2017 | Carletti | A61G 3/0227 |

OTHER PUBLICATIONS

IVECO Daily 70C21, Bodybuilders Instructions, http://ibb.iveco.com/Body%20Builder%20Instructions/UK%20and%20Ireland/UK/DAILY/DAILY%20MY2019/DAILY%20MY2019%20-%20Bodybuilder%20Instructions%202nd%20Edition.pdf, p. 17, Issue: Mar. 2020.
Extended European Search Report dated 2020.
Australian Examination Report dated Sep. 16, 2021.

* cited by examiner

AMBULANCE VEHICLE AND METHOD FOR PROVIDING AN AMBULANCE VEHICLE

PRIORITY STATEMENT

The present application hereby claims priority under 35 U.S.C. § 119 to European patent applications number EP 19212522.7 filed Nov. 29, 2019, the entire contents of which are hereby incorporated herein by reference.

FIELD

Embodiments of the invention generally relate to an ambulance vehicle, especially a mobile stroke unit, comprising an interior space for holding a patient and a support structure within the interior space for supporting a cot or stretcher used for transporting the patient. Additionally, embodiments of the invention generally relate a method for providing an ambulance vehicle.

BACKGROUND

Ambulance cots, especially motorised ambulance cots are commonly used with ambulance vehicles. By varying the height of the ambulance cot, the patient can easily be lifted into the ambulance without unnecessary back strain for the ambulance personal. This is especially the case when a device for loading the cot is mounted within the vehicle.

One limitation of this approach is that such a supported or automated loading is only possible up to a certain loading height, e.g. for common motorised cots and loading systems up to approximately 91 cm. While this loading height is easily sufficient for most ambulance vehicles, certain special purpose ambulance vehicles, especially ambulance vehicles with a gross vehicle mass above 3.5 t, tend to have rather high floors of the interior space for the patient and therefore rather high loading edges.

Examples for such ambulance vehicles are so called “mobile stroke units” that have a computer tomography device installed on the vehicle and therefore need to have a rather high gross vehicle mass and intensive care and heavy-duty ambulance vehicles. While it is typically still possible to load these vehicles with the discussed ambulance cots, this is only possible, when the ambulance cots are loaded very close to the floor. It is therefore typically not possible to install certain desired features, e.g. an air suspension between the cot and the floor of the interior space, in the vehicle without exceeding the mentioned loading height.

SUMMARY

In principle it would be possible to use ambulance cots that allow automatic or supported loading at larger loading heights. However, the inventors have discovered that since there is a very large number of such ambulance cots in use worldwide, replacing all of them to allow for the use of a limited number of special purpose ambulance vehicles is not a practical option.

At least one embodiment of the present invention therefore improves the interoperability of larger and/or heavier ambulance vehicles, especially of mobile stroke units, with common ambulance cots.

At least one embodiment of the present invention is directed to an ambulance vehicle, especially mobile stroke unit, comprising:

a support structure, within an interior space of the ambulance vehicle, to support a cot or stretcher used for transporting a patient; and at least one of
- an actuator to tilt the support structure, and
- a recess formed in a floor of the interior space, the support structure being at least partially housed in the recess.

At least one embodiment of the present invention is directed to a method for providing an ambulance vehicle, especially a mobile stroke unit, comprising:

installing a support structure, for supporting a cot or stretcher used for transporting a patient, in an interior space of the vehicle; and at least one of
- mounting an actuator, for tilting the support structure, within the interior space, and
- at least partially housing the support structure, during the installing, in a recess formed in a floor of the interior space.

BRIEF DESCRIPTION OF THE DRAWINGS

Other objects and features of the present invention will become apparent from the following detailed description considered in conjunction with the accompanying drawings. The drawings, however, are only principle sketches design solely for the purpose of illustration and do not limit the invention.

The drawings show different views of an example embodiment of an ambulance vehicle according to an embodiment of the present invention that can be provided by an embodiment of the method according to the present invention.

DETAILED DESCRIPTION OF THE EXAMPLE EMBODIMENTS

Figure 1:
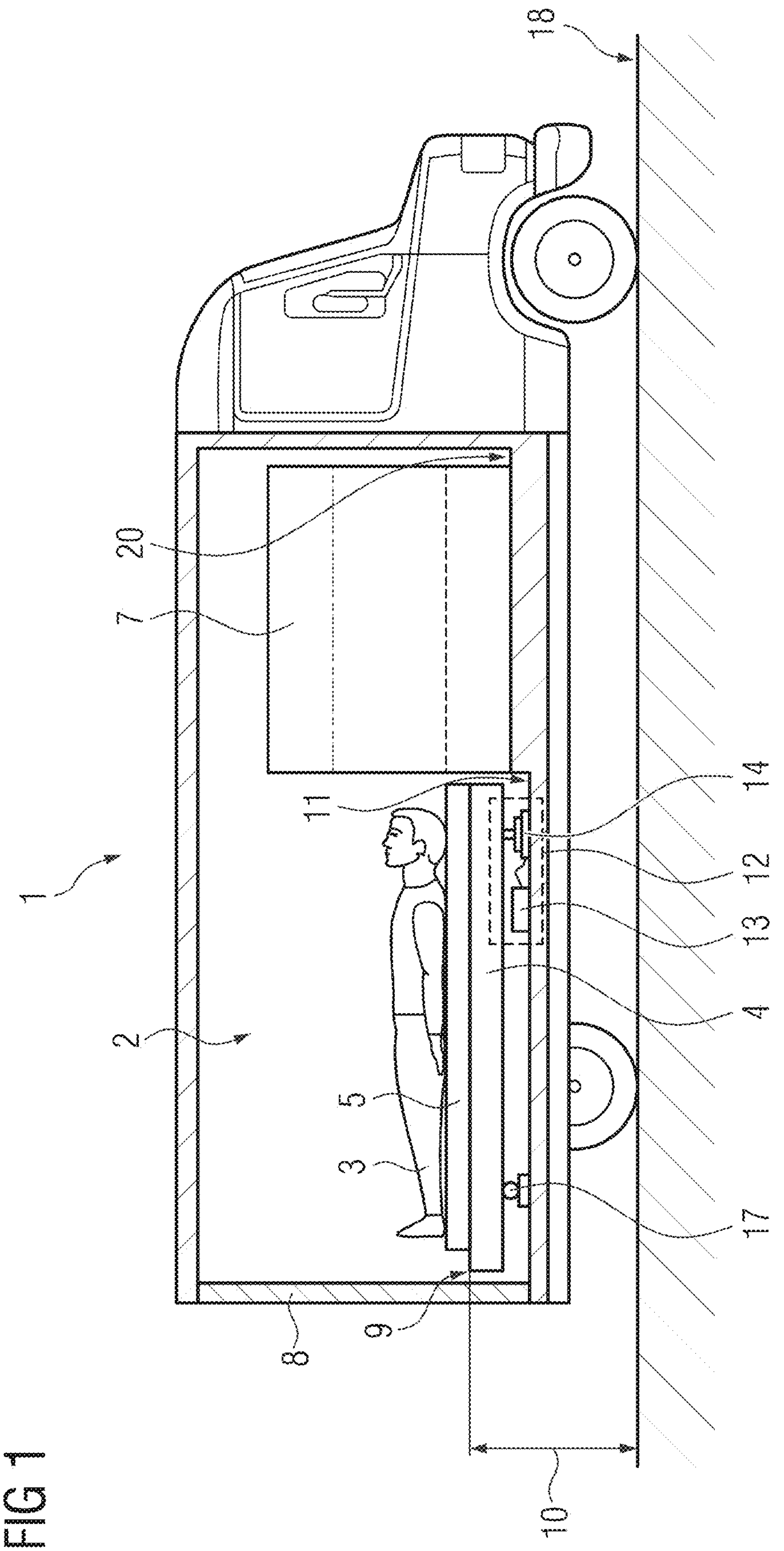
FIG. 1 shows an ambulance vehicle of an example embodiment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Embodiments are directed to an ambulance vehicle, wherein the vehicle comprises an actuator for tilting the support structure and/or wherein the support structure is at least partially housed in a recess formed in a floor of the interior space.

By actuating the actuator, the support structure can be tilted toward a loading area, e.g. towards backdoors of the interior space, which lowers the upper edge of the support structure in this loading area. Additionally or alternatively, a recess can be formed in a floor of the interior space which allows for a lower mounting of the support structure and therefore also for a lower height of the loading edge of this support structure. Therefore either of the mentioned alternatives or both of them can be used to lower the loading edge of a support structure and therefore allow the use of a relatively high support structure, e.g. a support structure comprising an air suspension for the mounted cot or stretcher, even if the height of the floor of the interior space is relatively high, e.g. in vehicles with high gross vehicle mass.

In some case, the use of one of the mentioned features might be sufficient to sufficiently lower the loading edge to allow the use of typical ambulance cots for loading a patient into the ambulance vehicle. It can however be necessary, to use both mentioned features and/or to use additional features for lowering the loading edge that will be discussed in detail below. The tilting of the support structure can e.g. be achieved by pivoting the support structure around a fixed axis. Even when the fixed axis is relatively close to the position of the loading edge, e.g. close to the back end of the vehicle, the loading edge can be lowered by lifting the opposite end of the support structure, e.g. the front end. While using a fixed axis for pivoting can be advantageous, since that allows for a robust mounting of the support structure to the vehicle, it is e.g. also possible to only support the support structure in the area of the loading edge by an edge of the recess of the floor and simply lift the other end.

As will be discussed in more detail below, the actuator can preferably be a pneumatic actor. Alternatively, it could e.g. be a hydraulic actor, an electric motor, etc.

During the discussion of the loading of the ambulance vehicle, it is mostly assumed that the vehicle itself is standing on a flat surface and that therefore the floor and the support structure in the non-pivoted position are essentially horizontal. If a loading should be performed, while the vehicle is standing on a slope that might increase the height of the loading edge, this can be compensated by providing a drive on wedge. By driving onto this wedge the vehicle can be arranged in an approximately horizontal position. Alternatively, a drive on wedge could also be used to further lower the loading edge.

The support structure can be coupled to the actuator in such a way that a front end of the support structure can be lifted by actuating the actuator. The front end of the support structure is the end that is removed the furthest from the loading edge in most instances, since loading is typically performed by an opening at the back of the ambulance vehicle. By lifting the front end of the support structure, the loading edge on the back side of the support structure can be lowered.

Preferably the actuator comprises at least one air cushion and a compressor for inflating the air cushion. The air cushion can especially be arranged at the front end of the support structure, therefore lifting the front end of the support structure when the air cushion is inflated. The air cushion can e.g. be wedge-shaped in its inflated state.

The ambulance vehicle according to at least one embodiment of the present invention can especially have a gross vehicle weight of more than 3.5 t and/or comprises a medical imaging device, especially a computer tomography device. The gross vehicle weight can e.g. be larger than 4 t or between 3.5 and 4.5 t. As mentioned above, the inventive features for lowering a loading edge of a support structure in an ambulance vehicle are especially advantageous when a relatively large and/or heavy ambulance vehicle is used. The described approach can also be used for even heavier ambulance vehicles, e.g. ambulance vehicles weighting more than 7 t or more than 11 t. In general, it is preferable to use ambulance vehicles that are lighter than 12 t.

The upper edge of the back end of the support structure can be less than 91 cm above the ground in a loading state of the ambulance vehicle. As discussed above ambulance vehicles are typically loaded from an opening in the back and lowering the loading edge below 91 cm allows for the use of an automatic or assisted loading of common ambulance cots.

In the loading state the support structure is preferably tilted by actuating the actuator. Also other measures can be performed to lower the loading edge, e.g. lowering an air suspension within the support structure to lower the height of the support structure and/or lowering an air suspension of the ambulance vehicle itself.

Preferably the support structure is or comprises an air suspension. Support structures for cots or stretchers including air suspensions that are commonly available tend to have a height of e.g. 135 mm. As already discussed, using such a relatively high support structure in a large and/or heavy ambulance vehicle can be problematic due to the floor height of such ambulance vehicles. Using at least one of the approaches discussed in this document, the loading edge can be sufficiently lowered to allow for a combination of an air suspension for the cot and an automatic or assisted loading even for such larger and/or heavy ambulance vehicles.

The ambulance vehicle can comprise a control unit that can control the actuator and/or an air suspension of the vehicle and/or an air suspension within the support structure. This control unit can especially actuate the mentioned devices to transfer the ambulance vehicle into the loading state discussed above, in which a loading edge is especially low.

The ambulance vehicle can be a modified production vehicle, wherein the modification involves lowering the rear axle suspension and/or using an intermediate frame between the vehicle frame and the floor of the interior space that is at least 5 mm or at least 10 mm or at least 20 mm thinner than the intermediate frame used in the production vehicle and/or removing a section of the floor to provide the recess.

Ambulance vehicles are typically provided by modifying a production vehicle, e.g. a carrier vehicle or a small truck. For mobile stroke units and other heavy-duty ambulance vehicles larger carrier vehicles, e.g. carrier vehicles with a gross vehicle mass of up to 7.5 t, can be used.

To lower the loading edge, it is e.g. possible to lower the rear axle suspension. This can be especially advantageous when at least the rear axle has an air suspension. During the normal operation of the ambulance vehicle the lowering of the suspension can be compensated by using a higher ride height for the air suspension. When a cot or stretcher has to be loaded, the loading edge can be lower by dropping the height of the air suspension. By reducing the minimum height of the rear axle suspension, the whole ambulance vehicle can be standing at an angle to the horizontal plane when the rear axle suspension is lowered below the level of a front axis suspension therefore further lowering the loading edge.

In a typical application for relatively heavy ambulance vehicles, e.g. in mobile stroke units carrying a computer tomography device, it is sufficient to use a vehicle with a gross vehicle mass of approximately 4 t. Adequate production vehicles for a modification in this specific weight range are often not available. Therefore the modification may start with a production vehicle with a higher gross vehicle mass. It can therefore be possible to perform certain modifications e.g. the use of a thinner intermediate frame, while still providing a sufficient stability for carrying the intended weight. This can further lower the loading edge.

By combining a thinner intermediate frame, a lowered rear axle suspension, an actuator for tilting the support structure and the use of a recess in the floor of the interior space, the loading edge can e.g. be lowered by 30 mm, which can be sufficient to allow for the use of a support structure comprising an air suspension.

Additionally to the ambulance vehicle, at least one embodiment of the invention concerns a method for providing an ambulance vehicle, especially a mobile stroke unit, wherein a support structure for supporting a cot or stretcher used for transporting a patient is installed in an interior space of the vehicle, wherein an actuator for tilting the support structure is mounted within the interior space and/or wherein the support structure is installed in such a way that it is at least partially housed in a recess formed in a floor of the interior space.

The method can especially be used to provide an ambulance vehicle according to the present invention. Features discussed with respect to the ambulance vehicle can be freely transferred to the method and vice versa with the discussed advantages.

The ambulance vehicle can be provided by modifying a production vehicle by lowering its rear axle suspension and/or by using an intermediate frame between the vehicle frame and the floor of the interior space that is at least 5 mm or at least 10 mm or at least 20 mm thinner than the intermediate frame used in the production vehicle and/or by removing a section of the floor to provide the recess.

The floor section can e.g. be removed by cutting or milling the floor of the interior space of the production vehicle. Alternatively it would be possible to directly produce a modified floor for the interior space of the ambulance vehicle.

As already discussed, it can be possible to use a thinner intermediate frame than the intermediate frame used in the production vehicle, if the expected overall load is lower than the expected load for the production vehicle. Alternatively a thinner frame can also be provided by using other stiffening measures, e.g. by increasing the dimensions of the bars of the frame within the horizontal plane. This might lead to higher weight of the intermediate frame when the same strength of the frame is required, but this is acceptable for lowering the height of the loading edge.

For lowering the rear axle suspension several approaches are possible that can also be combined. It is possible to retract and reinforce the frame of the vehicle in the relevant sections, use tailor-made rear axle connecting parts, such as air bellow carriers, use additional brackets for the stabilizer in the parabolic spring, replace cross bars for the upper shock absorber mounting and/or to position the control valves of an air suspension in a different position to allow amounting at the modified height. To lower the suspension the suspension components should be mounted to a higher point of the frame of the vehicle.

FIG. 1 shows an ambulance vehicle 1 comprising an interior space 2 for holding a patient 3 and a support structure 4 within the interior space 2 for supporting a cot 5 or a stretcher used for transporting the patient 3. In the example in the ambulance vehicle 1 is a mobile stroke unit with features a medical imaging device 7, in the example a computer tomography device, mounted within the interior space 2. Since the addition of a computer tomography device adds approximately 700 kg of weight to the ambulance vehicle 1, a mobile stroke unit can typically not be implemented with vehicles having a gross vehicle mass of less than 3.5 t. Therefore the ambulance vehicle 1 as shown in FIG. 1 can e.g. be based on a production vehicle that is designed for a gross vehicle mass of more than 4 t, especially of more than 7 t.

A stretcher or cot 5 is loaded onto the support structure 4 by opening the doors 8 at the rear end of the ambulance vehicle 1 and lifting the stretcher or cot 5 onto the loading edge 9. To reduce the lifting work of personal it is advantageous to use a cot 5 with wheels that fold to allow a storage on top of the support structure 4. Such ambulance cots 5 are well known and will therefore not be discussed in detail.

Modern ambulance cots 5 allow for a manual or motorised height adjustment and can be combined with loading systems mounted in the ambulance vehicle 1 to load the cot 5 automatically or at least with minimum lifting effort onto the support structure 4. An automatic or assisted loading is however only possible to certain maximum height of the loading edge 9.

Production vehicles with a relatively high gross vehicle mass typically have a relatively high floor 20. When the support structure 4 is mounted on such a floor 20 without any further modifications of the vehicle, the overall height 10 of the loading edge 9 will typically be to high for the mentioned automatic or assisted loading of the cot 5 and therefore the patient 3 into the ambulance vehicle 1. Therefore the ambulance vehicle 1 is modified in several ways to lower the height 10 of the loading edge 9. This will be discussed in detail below. While four distinct measures are used in the ambulance vehicle 1, not all of these measures need to be used. It can be sufficient to implement one, two or three of these measures.

As a first measure the height 10 of the loading edge 9 can be lowered by at least partially housing the support structure 4 in a recess 11 formed in the floor 20 of the interior space 2. The recess 11 can e.g. be formed by cutting or milling out an area of the floor 20 of a production vehicle on which the ambulance vehicle 1 is based. Alternatively it is also possible to directly produce a floor 20 providing this recess 11.

Figure 2:
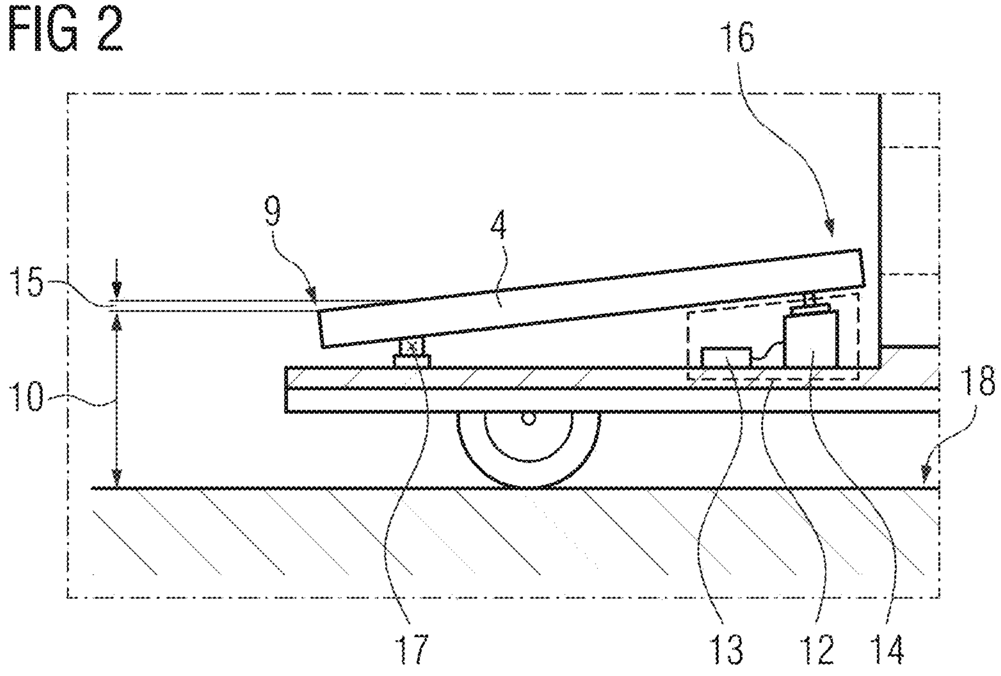
FIG. 2 shows an inflated state of the air cushion in a detailed view of a relevant section of the ambulance vehicle.

Additionally or alternatively the height 10 of the loading edge 9 over the ground 18 can be lowered by actuating an actuator 12 mounted in the interior space 2. In the example the actuator 12 is formed by an air cushion 14 that can be inflated by a compressor 13. An inflated state of the air cushion 14 is shown in FIG. 2 that shows a detailed view of the relevant section of the ambulance vehicle 1. In the example the tilting is achieved by pivoting the support structure 4 around a pivot 17. The lifting of the front end 16 of the support structure 4 lowers the height 10 of the loading edge 9 by the distance 15.

Figure 3:
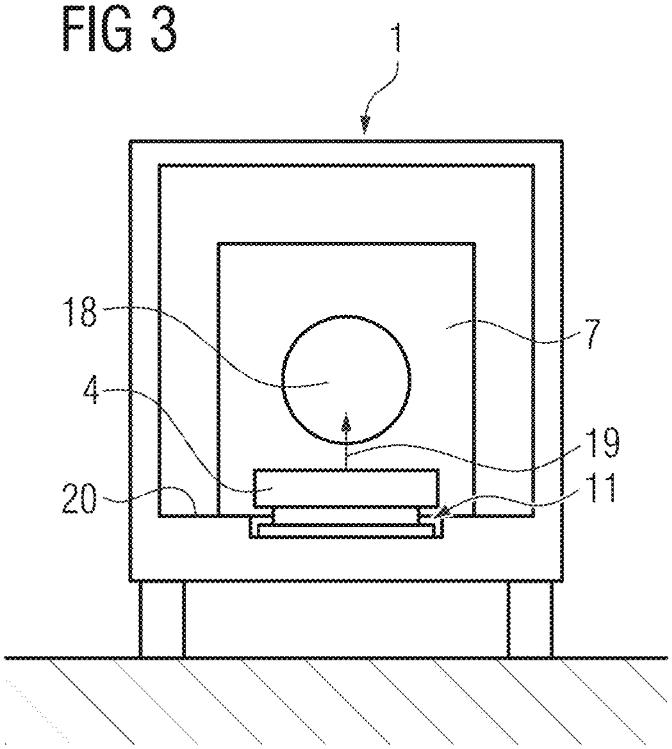
FIG. 3 shows the support structure can be expanded to lift the patient as indicated by the arrow.
Figure 4:
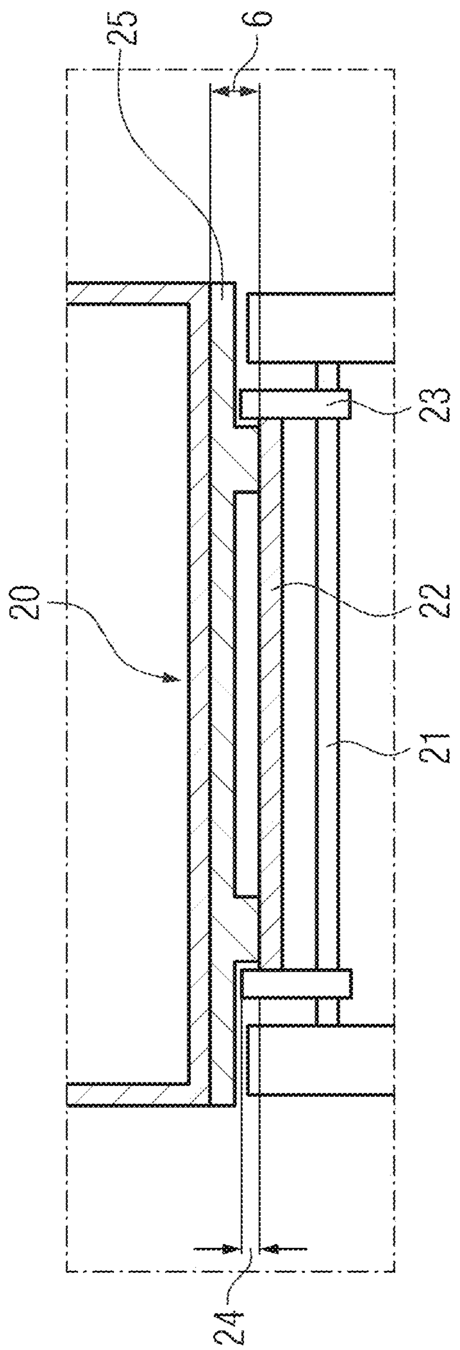
FIG. 4 shows a further detailed view of the ambulance vehicle in the area of the rear axle.

The two discussed measures, optionally in combination with two further measures that will later be discussed with reference to FIG. 4, allow for a sufficient lowering of the loading edge 9 such that a relatively high support structure 4, e.g. a support structure 4 comprising an air suspension, can be used. The use of an air suspension as the support structure 4 or as part of the support structure 4 reduces the vibrations of the patient 3. Additionally it allows for the height of the stretcher or cot 5 and therefore of the patient 3 to be adjusted. This can allow for personal positioned on the floor 20 to work on the patient 3 more comfortably. Additionally the air suspension and therefore the support structure 4 can be expanded to lift the patient 3 as indicated by the arrow 19 in FIG. 3, e.g. to allow for an easy transfer of the patient 3 into the bore 18 of the computer tomography device.

Two further measures to further reduce the height 10 of the loading edge 9 will be discussed with reference to FIG. 4 which shows a further detailed view of the ambulance vehicle 1 in the area of the rear axle 21. A production vehicle can e.g. be modified by lowering the suspension 23 of the rear axle 21, that can preferably be an air suspension. If the frame 22 of the vehicle 1 is shifted downwards with respect to the suspension 23 by the distance 24 this also lowers the height of the loading edge 9.

It is especially preferable when only the rear axle suspension 23 is lowered and the front axle suspension is unmodified. This will tilt the floor 20 and therefore lead to an additional tilt of the support structure 4 and therefore a lowered loading edge 9. During the normal operation of the ambulance vehicle 1 the distance 24 by which the suspension 23 is lowered can be compensated by adjusting the suspension 23 for a higher right height. This is easily possible when an air suspension is used. When a cot 5 is to be loaded into the ambulance vehicle 1 the suspension 23 can be lowered and additionally the air cushion 14 can be inflated to allow a loading while the loading edge 9 is lowered.

A further modification of a production vehicle that allows for a lower loading edge 9 is the use of a modified intermediate frame 25. The height 6 of the intermediate frame 25 can be at least 5 mm or at least 10 mm or at least 20 mm less than the height of the intermediate frame used in the respective production vehicle. Using a thinner intermediate frame 25 without further modifications might e.g. be possible if the production vehicle is designed for a gross vehicle mass that is noticeably above the necessary gross vehicle mass for the ambulance vehicle 1. E.g. the ambulance vehicle can be based on a production vehicle with a gross vehicle mass of more than 7 t and the necessary gross vehicle mass for ambulance vehicle might be approximately 4 t. Since less weight needs to be carried, a thinner intermediate frame 25 can be used.

Alternatively or additionally it is possible to expand the area of the individual struts of the intermediate frame 25 within the horizontal plane to allow for the use of a thinner intermediate frame 25 while reaching a similar stability.

Although the present invention has been described in detail with reference to the preferred embodiment, the present invention is not limited by the disclosed examples from which the skilled person is able to derive other variations without departing from the scope of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An ambulance vehicle, comprising:

a support structure, within an interior space of the ambulance vehicle, to support a cot or stretcher used for transporting a patient; and at least one of an actuator to tilt the support structure, and a recess formed in a floor of the interior space, the support structure being at least partially housed in the recess.

2. The ambulance vehicle of claim 1, wherein the support structure is coupled to the actuator such that a front end of the support structure is liftable by actuating the actuator.

3. The ambulance vehicle of claim 1, wherein the actuator comprises at least one air cushion and a compressor to inflate the air cushion.

4. The ambulance vehicle of claim 1, wherein the ambulance vehicle has a gross vehicle weight of more than 3.5 t.

5. The ambulance vehicle of claim 1, wherein an upper edge of a back end of the support structure is less than 91 cm above ground in a loading state of the ambulance vehicle.

6. The ambulance vehicle of claim 1, wherein the support structure is an air suspension or wherein the support structure comprises an air suspension.

7. The ambulance vehicle of claim 1, wherein the ambulance vehicle is a modified production vehicle, and wherein a modification of the modified production vehicle involves at least one of:

lowering a rear axle suspension, using an intermediate frame between a vehicle frame and the floor of the interior space that is at least 5 mm thinner than the intermediate frame used in the production vehicle, and removing a section of the floor to provide the recess.

8. A method for providing an ambulance vehicle, comprising:

installing a support structure, for supporting a cot or stretcher used for transporting a patient, in an interior space of the vehicle; and at least one of mounting an actuator, for tilting the support structure, within the interior space, and at least partially housing the support structure, during the installing, in a recess formed in a floor of the interior space.

9. The method of claim 8, wherein the ambulance vehicle is provided by modifying a production vehicle by at least one of:

lowering a rear axle suspension of the vehicle, using an intermediate frame between a vehicle frame and the floor of the interior space that is at least 5 mm thinner than the intermediate frame used in the production vehicle, and removing a section of the floor to provide the recess.

10. The ambulance vehicle of claim 1, wherein the ambulance vehicle is a mobile stroke unit.

11. The method of claim 8, wherein the ambulance vehicle is a mobile stroke unit.

12. The ambulance vehicle of claim 2, wherein the actuator comprises at least one air cushion and a compressor to inflate the air cushion.

13. The ambulance vehicle of claim 1, further comprising a medical imaging device.

14. The ambulance vehicle of claim 13, wherein the medical imaging device is a computer tomography device.

15. The ambulance vehicle of claim 4, further comprising a medical imaging device.

16. The ambulance vehicle of claim 2, wherein an upper edge of a back end of the support structure is less than 91 cm above ground in a loading state of the ambulance vehicle.

17. The method of claim 8, wherein the actuator comprises at least one air cushion and a compressor to inflate the air cushion.

* * * * *